(12) United States Patent
Zaniboni et al.

(10) Patent No.: US 9,125,426 B2
(45) Date of Patent: Sep. 8, 2015

(54) MACHINE FOR PRODUCING AND DISPENSING LIQUID OR SEMILIQUID FOOD PRODUCTS

(75) Inventors: Gianni Zaniboni, Borgonuovo di Sasso Marconi (IT); Gino Cocchi, Bologna (IT); Roberto Lazzarini, Reggio Emilia (IT)

(73) Assignee: CARPIGIANI GROUP—ALI S.p.A. (IT)

( * ) Notice: Subject to any disclaimer, the term of this patent is extended or adjusted under 35 U.S.C. 154(b) by 1022 days.

(21) Appl. No.: 12/678,071

(22) PCT Filed: Sep. 14, 2007

(86) PCT No.: PCT/IT2007/000640
§ 371 (c)(1),
(2), (4) Date: Oct. 4, 2010

(87) PCT Pub. No.: WO2009/034592
PCT Pub. Date: Mar. 19, 2009

(65) Prior Publication Data
US 2011/0011887 A1     Jan. 20, 2011

(51) Int. Cl.
B67D 7/08     (2010.01)
A23G 9/28     (2006.01)
A23G 9/22     (2006.01)

(52) U.S. Cl.
CPC ... *A23G 9/28* (2013.01); *A23G 9/22* (2013.01)

(58) Field of Classification Search
CPC .................................. A23G 9/22; A23G 9/28
USPC .......... 222/23, 52, 54, 146.1, 146.6; 700/239, 700/244
See application file for complete search history.

(56) References Cited

U.S. PATENT DOCUMENTS

| | | |
|---|---|---|
| 4,551,025 A | 11/1985 | Ames et al. |
| 4,719,574 A | 1/1988 | Duback et al. |
| 5,481,260 A | 1/1996 | Buckler et al. |
| 5,730,324 A | 3/1998 | Shannon et al. |
| 6,199,603 B1 * | 3/2001 | DiGianfilippo et al. ........ 141/83 |
| 6,637,214 B1 | 10/2003 | Leitzke et al. |

(Continued)

FOREIGN PATENT DOCUMENTS

| | | |
|---|---|---|
| EP | 1829453 | 9/2007 |
| EP | 1905730 | 4/2008 |

(Continued)

OTHER PUBLICATIONS

International Search Report and Written Opinion dated Jun. 10, 2008 from PCT application.

*Primary Examiner* — Daniel R Shearer
(74) *Attorney, Agent, or Firm* — Timothy J. Klima; Shuttleworth & Ingersoll, PLC

(57) ABSTRACT

A machine for producing and dispensing liquid or semiliquid food products, includes: a holding vat for a liquid base product; a treatment circuit for treating the liquid base product to obtain a liquid or semiliquid food product; a dispensing mechanism to dispense the food product; one or more actuators acting on the base product, food product and/or parts of the machine; and one or more sensors for detecting one or more operating parameters of the machine. The machine further includes an interfacing unit preferably provided with a control card operatively associated with at least one of the one or more sensors to receive a respective one of the one or more operating parameters and transmit it to a remote processing unit.

22 Claims, 1 Drawing Sheet

(56) References Cited

U.S. PATENT DOCUMENTS

| | | | |
|---|---|---|---|
| 6,807,460 B2 * | 10/2004 | Black et al. | 700/244 |
| 6,955,302 B2 * | 10/2005 | Erdman, Jr. | 236/51 |
| 2003/0009313 A1 * | 1/2003 | May et al. | 702/188 |
| 2003/0077364 A1 | 4/2003 | Feola | |
| 2003/0121937 A1 | 7/2003 | Black et al. | |
| 2004/0251270 A1 | 12/2004 | Davis et al. | |
| 2006/0113322 A1 * | 6/2006 | Maser et al. | 222/129.1 |

FOREIGN PATENT DOCUMENTS

| | | |
|---|---|---|
| GB | 2283845 | 5/1995 |
| WO | 0070963 | 11/2000 |
| WO | 0143088 | 6/2001 |
| WO | 0212112 | 2/2002 |
| WO | 02090841 | 11/2002 |
| WO | 2004091324 | 10/2004 |
| WO | 2006081727 | 8/2006 |

* cited by examiner

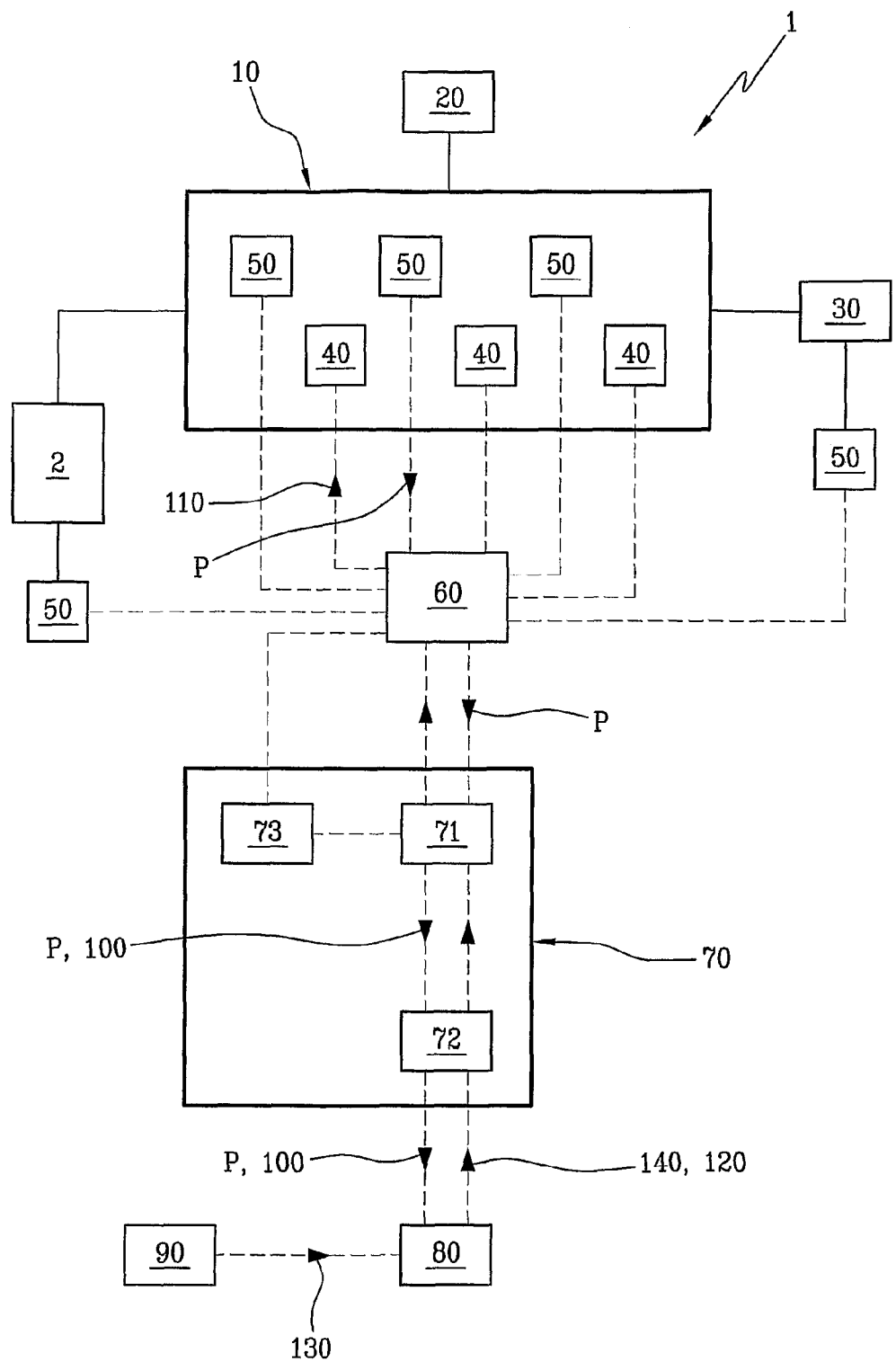

MACHINE FOR PRODUCING AND DISPENSING LIQUID OR SEMILIQUID FOOD PRODUCTS

CROSS-REFERENCE TO RELATED APPLICATIONS

This application is the National Phase of International Application PCT/IT2007/000640 filed Sep. 14, 2007 which designated the U.S. and that International Application was published under PCT Article 21(2) in English.

This application claims priority to PCT Application No. PCT/IT2007/000640 filed Sep. 14, 2007, which applications are incorporated by reference herein.

The present invention relates to a machine for producing and dispensing liquid or semiliquid food products.

The present invention particularly relates, but not in any limiting sense, to machines for producing and dispensing water-ices, sorbet-ices, ice-creams, soft ice-creams, milk cream, yoghurts and the like, and to machines for producing and preserving blends or mixtures for ice-creams, creams, sauces, soups, kneaded mixtures in general and the like.

As known, these machines comprise a holding vat for a liquid base product, and a treatment circuit for the base product, to obtain said consumer goods. The latter can then be dispensed by means of suitable dispensers and/or preserved in a conservation tank.

The treatment circuit can comprise, depending on the type of machine taken into account, heat treatment means to cool or heat the product, a whisking cylinder to keep the product to some degree of fluidity, mixing means to mix the base product with an auxiliary product, such as a seasoning substance, etc.

Generally, the machines are provided with a plurality of actuators, interlocked with a control unit, so that the different working steps of the base product are performed following a preset program.

However, due to a series of reasons of different nature, faults, malfunctions, failures in the working process, etc. may be likely to occur at the inside of the machine.

In addition, also in the absence of these unforeseen events, it is required that the machine be suitably adjusted and set, depending on the type of product to be obtained and the characteristics the product must have, for example.

However, it is impossible for an operator to be always present in the vicinity of the machine in order to deal with the most urgent situations; therefore it may happen that a machine starts operating in an incorrect manner or stops running without any person capable of facing the situation sufficiently quickly being present.

The importance of this aspect clearly appears if we think that these machines are set for treatment and supply of foodstuffs characterised by a very delicate equilibrium to such an extent that even with small variations in the working or preservation conditions to which they are submitted, they run the risk of becoming unusable.

It is therefore apparent that the steps of controlling and setting the working operations are very critical in said machines.

Accordingly, it is an aim of the present invention to provide a machine for producing and dispensing liquid or semiliquid food products that can be easily monitored and controlled, so that all situations that mostly expose to danger the integrity of the machine and/or the products treated and supplied by the same can be faced very quickly.

In accordance with the invention, this aim is achieved by a machine for producing and dispensing liquid or semiliquid food products comprising the technical features set out in one or more of the appended claims.

The technical features of the invention, according to the above aims, clearly appear from the contents of the claims reproduced below and the advantages of same will be more apparent in the following detailed description given with reference to the accompanying drawing representing an embodiment of the invention by way of non-limiting example. FIG. 1 in particular shows a block diagram of the machine in accordance with the present invention.

In the accompanying drawing, a machine in accordance with the present invention has been generally identified with reference numeral 1.

First of all, machine 1 comprises a holding vat 2 for a liquid base product. The liquid base product can be, only by way of example, liquid milk cream, a mixture of products for ice-cream, a syrup; generally, the liquid base product can be any liquid product used for producing a liquid or semiliquid finished food product.

The finished food product can consist of, by way of example, water-ice, sorbet-ice, ice-cream, soft ice-cream, milk cream, yoghurt, a yoghurt-ice-cream blend or mixture for ice-cream, cream, sauce, soup, a kneaded mixture in general and the like.

The finished product can also be an ice-cream frappe or shake; by the term "ice-cream frappe" or "shake" it is intended any frozen or "semifreddo" food product of neutral taste, also termed neutral ice-cream, shaken or blended together with a flavouring syrup having the desired taste and possibly with addition of soft fruit pulp or solid parts such as seeds.

To obtain the final product starting from the base product, the machine 1 comprises a treatment circuit 10. In turn, said treatment circuit 10 can comprise heat treatment means, to cool/heat the base product and/or finished product; the heat treatment means can also be designed to keep the base product and/or finished product to a predetermined temperature.

The heat treatment 10 may comprise a whipping-extruding device, particularly if the finished product consists of whipped cream.

The treatment circuit 10 may also comprise a whisking device particularly if the finished product consists of ice-cream.

The treatment circuit 10 may also comprise a blending/mixing unit, particularly if the final product consists of ice-cream frappe or shake.

The treatment circuit 10 is associated with pump means 20 enabling the base product to move forward in the treatment circuit 10 until reaching the dispensing means 30 suitably set to enable dispensing of the finished product.

The dispensing means 30 can consist of nozzles or taps; said dispensing means 30 can be manually adjusted or regulated by suitable electronic control means cooperating with a sensor adapted to detect the amount of finished product dispensed, so as to establish the instant at which the dispensing means must be automatically shut off.

The machine comprises one or more actuators 40, acting on the base product, the finished product and/or parts of the machine 1 itself.

Preferably, actuators 40 are part of said treatment circuit 10 or are associated therewith.

It will be noted that in the present context, for actuators it is intended all devices or members acting on the base product, the finished product, possible intermediate products in order to vary any physical or mechanical, static or dynamic feature of same; in the present context the actuators can also consist of any device or member capable of actively operating on any component of the machine 1.

By way of example alone, defined as actuators can be the devices adapted to cause advancing of the base product along the treatment circuit, the devices designed for whisking of the finished product or blending of two or more base o intermediate products, the devices suitable for heat-treatment of the products present in the machine 1, in order to increase, reduce or stabilise the temperature of same, automatic dispensing devices for the finished product, the devices (such as a gear pump) for air-pressurisation of the liquid mixture constituting the base product for the so-called soft ice-cream, in order to give the finished product a more or less marked creamy consistency, etc.

The machine 1 further comprises one or more sensors 50 to detect one or more operating parameters P of the machine 1 itself.

These operating parameters P can be, by way of example alone, temperature (of the base product, the finished product or specific areas within the machine 1), pressure (within ducts or containers where the different products can be), levels or amounts (of products present within the machine or dispensed through the dispensing means), currents and/or voltages (representative of the different circuits and electric/electronic devices present in the machine 1, such as the above mentioned actuators), movement speed of the products at the inside of the machine or of moving parts of the machine itself, physical characteristics of the base product and/or the finished product (e.g. consistency), state variables of the different members, switches, actuators present in the machine 1, etc.

Preferably, the machine 1 further comprises a local processing unit 60 connected to said actuators 40 and sensors 50 and designed to supervise operation of the machine 1.

Practically, the local processing unit 60 can be an electronic control card of known type, suitably set to cause operation of the machine 1 following a previously entered program so as to obtain the finished product starting from one or more base products.

The machine 1 further comprises an interfacing unit 70 operatively associated with at least one of sensors 50 to detect a respective operating parameter P and transmit it to a remote processing unit 80 (to be dealt with in more detail later on). The interfacing unit 70 is preferably provided with a management module 71 operatively associated with the local processing unit 60 to receive said operating parameter P, compare it with a reference value and send it, depending on the result of this comparison, to the remote processing unit 80.

In particular, connection between the local processing unit 60 and management module 71 of the interfacing unit 70 is obtained through a connection of the serial type (e.g. RS232).

Advantageously, the management module 71 receives a plurality of operating parameters P so as to be able to define a complete picture of the situation of the machine 1.

This picture of the situation may comprise both the so-called "snap-shot", i.e. the assembly of data on the input of the local processing unit 60, of the state of the outputs of same and of some statistical data, and the so-called "parametersnap", i.e. the assembly of the input data packets defining the operating modes according to which the machine 1 is set.

The operating parameters P are continuously supplied, at a predetermined frequency, by the local processing unit to the management module 71.

In the preferred embodiment, the "snapshot" and "parametersnap" are transmitted to the management module 71 at different frequencies, e.g. the "snapshot" every 2 seconds and the "parametersnap" every 10 seconds.

The management module 71 carries out a comparison between the operating parameters P and respective reference values; should important differences emerge, the management module 71 will send a suitable notification signal 100 to the remote processing unit 80.

The notification signal 100 can advantageously incorporate the operating parameters P obtained from the last reception.

The reference values can be prestored values; alternatively, the reference values can be the operating parameters P previously received (e.g. through the second-last reception step) from the management module 71 and representative of an overall situation of correct operation of the machine 1.

In the preferred embodiment, the management module 71 following sending of said notification signal 100 to the remote processing unit 80, will also send to the remote processing unit 80, over a preset time interval, the operating parameters P detected at subsequent time instants relative to the instant at which reading of the operating parameters P that have caused transmission of the notification signal 100 has occurred.

Preferably, the management module 71 is designed to send to the remote processing unit 80, also the operating parameters P detected during a given time interval before sending of the notification signal 100; these parameters can be stored in a suitable buffer for example, so that they remain available for a certain period of time, in the event that the notification signal 100 should be generated and transmitted.

In this manner, the remote processing unit 80 not only has at its disposal the picture describing the situation at the moment the anomaly has occurred, but also evolution in time of this situation and also preferably data representative of the situation that has led to generation of the anomaly.

It is to be noted that the operating parameters P can be transmitted by the management module 71 both following detection of an anomaly (failure, malfunction, alarm), as described above, and depending on a predetermined time limit, irrespective of the true operating conditions of the machine 1, so that a sort of "historical" situation about the machine operation will be available for the remote processing unit 80.

The operating parameters P can be sent by the management module also when a predetermined value is reached by one or more counters; these counters are suitably increased/decreased during operation of the machine 1 depending on the number of dispensed portions of food product, for example.

In order to send to the remote processing unit 80, said respective operating parameter P (or said operating parameter's) and/or the notification signal 100 generated by the management module 71, the interfacing unit 70 is provided with a communication module 72.

Preferably, the communication module 72 can be driven between a rest condition, at which it transmits no signals, and an operating condition at which it at least transmits signals.

In more detail, the communication module 72 is normally in a rest condition; when the management module 71 must send signals (notification signal 100, operating parameters P) to the remote processing unit 80, said management module will "awake" the communication module 72 and will supply the same with data to be transmitted.

Practically, the communication module 72 can be a GSM/GPRS modem, an ADSL modem, an ISDN modem or an Ethernet module. The communication module 72 can also be a connecting module to a local network, in turn suitable for connection to a network enabling a remote connection to said remote processing unit 80; for instance, wireless modules (WiFi, Bluetooth, Zigbee, etc.) are involved.

The communication module 72 can be incorporated either into a microprocessor board (SH or ARM technologies, for example) or in an industrial PC provided with an operating system, mounted on board the machine 1; in this case the type of connection used can be Bus. ISA, EISA, USB, Ethernet, WiFi, Bluetooth, ZigBee, etc. The local networks to which the communication module 72 is linked therefore enable a remote connection and a communication with the remote processing unit 80.

Generally, the communication module 72 allows access to the ISP which is the closest to the machine 1 in a direct or indirect manner, so that the remote processing unit 80 can be reached through the Internet.

Advantageously, the management module 71 can be such arranged that, on occurrence of particular alarm events, it can, in addition to performing the above described operations in order to supply the remote processing unit 80 with all necessary data, also send an SMS in an automatic manner to a GSM device of an operator responsible for it so that the latter can be immediately put on the alert.

It will be recognised that the SMS message can be directly sent by the management module 71 or can be sent by the remote processing unit 80, following data received by the management module 71 itself.

In addition to the above, the interfacing unit 70 can be operatively associated with at least one actuator 40, to make said actuator 40 receive a local command/adjustment signal 110 as a function of a remote command/adjustment signal 120 sent to the interfacing unit 70 by the remote processing unit 80.

In more detail, communication between the remote processing unit 80 and said actuator 40 takes place by means of the management module 71 and the local processing unit 60: the management module 71 causes the remote command/adjustment signal 120 to be received by the local processing unit 60 so that the latter can send the corresponding local signal 110 to the actuator.

Preferably, the interfacing unit 70 further comprises a memory 73 used for communication between management module 71 and local processing unit 60; when the management module 71 receives the remote signal 120 from the remote processing unit 80, it stores contents thereof into memory 73. The local processing unit 60 then reads these contents from memory 73 and generates the local command/adjustment signal 110 as a function of the remote signal 120.

Note that memory 73 can be also used for storing the above mentioned "snapshot"; this storage can be aimed both at a comparison between snapshots detected at different time instants, and at transmission of the snapshot to the remote processing unit 80; memory 73 can therefore be also used, if it is deemed necessary, for communication between management module 71 and remote processing unit 80.

Preferably, memory 73 can contain a snapshot buffer and/or a buffer of operating parameters P.

Only by way of example, memory 73 can be a Flash Memory, a Memory Card, a USB storage device, etc.

The remote command/adjustment signal 120 can for example refer to the so-called "parameter table"; the remote processing unit 80 sends the table containing the values that one or more setting parameters of the machine must take, by incorporating it into the remote signal 102. These values are stored onto memory 73 by the management module 71, so that the local processing unit 60 (electronic card) can pick them up and consequently update its operation, sending at least one suitable local signal 110 to the involved actuator 40 (or the involved actuators 40).

The remote command/adjustment signal 120 can also refer to the software of the local processing unit 60 or the software of the management 71 and communication 72 modules; when updating of one or more of these software programs is made necessary, the remote processing unit 80 will send said updating following the above described technique, preferably also using memory 73 the software of which is temporarily stored to be then really installed, on occurrence of a restart of the machine 1, for example.

Advantageously, also communication from the remote processing unit 80 to the management module 71 takes place through the communication module 72.

As above said, in particular when the communication module 72 uses the GPRS connectivity, the communication module 72 is usually in the rest condition, so that it cannot sent possible remote command/adjustment signals 120 received to the management module 71.

When the remote processing unit 80 must send a remote signal 120 to the management module 71, it first "awakes" the communication module 72 through a suitable connection request signal 130. Practically, the request signal 130 may consist of a true telephone call; the communication module 72 for example provided with a suitable SIM card, on reception of this telephone call, is activated and reaches its operating condition so that it can receive the remote command/adjustment signal 120 and send it to the management module 71.

Still in the event of a connectivity of the GPRS type, the rest condition of the communication module 72 is that at which this module is linked to the GPRS network, but there are not active data transmissions; at the moment the management module 71 or the remote processing unit 80 need to transmit one or more of the above described pieces of information, they awake the communication module 72 that, through activation of data transmission, will enable the required exchange of information.

Preferably, the remote command/adjustment signal 120 is generated by the remote processing unit 80 as a function of a main signal 140 transmitted by a computer 90 remotely connected to the remote processing unit 80 itself.

In other words, the remote processing unit 80 acts as a server making available the different data received from the management module 71 of the machine 1 through the Internet, following criteria of selective accessibility to inhibit the various data from being made usable by uninterested individuals too.

The machine owner and/or the operators responsible for control and servicing of said machine 1 can therefore accede to that which is made available by the remote processing unit 80 through the Internet and a remote computer 90.

The owner and/or the operators therefore will be able to interact by sending to the remote processing unit 90, at least one main signal 140 in which for instance parameters that are to be inputted, regulated, modified are specified. Depending on this main signal 140, the remote processing unit 80 will generate at least one respective remote command/adjustment signal 120 so as to be able to put into practice that which has been transmitted by the remote computer 90, following the above described techniques.

By means of the remote computer 90 and the remote processing unit 80 it is therefore possible to make available a remote monitoring service,1 in real time, of the machine 1, a remote control service through which the various software programs can be updated and the operating parameters of the machine 1 can be modified, a "reporting" service for receiving series of information of technical/commercial character either periodically or on occurrence of predetermined events, and a remote diagnosis service where, in addition to said monitoring, it is possible to determine from a remote site, which are the causes of failure of the machine 1.

It will be recognised that while reference has been hitherto made to a single machine 1, the monitoring system can be applied to a plurality of machines that, exactly due to the above mentioned remote connections, can be positioned everywhere (at any point that can be reached by these connections).

It is therefore apparent that a single operator, by virtue of the above, will be able to remotely monitor and control any number of machines, therefore maximising the efficiency of the control activity on these machines.

The invention achieves important advantages.

First of all, the machine of the invention can be easily monitored and controlled from a remote site, so that all situations that mostly expose to danger the integrity of the machine and/or the products treated and supplied by the latter can be faced very quickly.

In addition, the connecting structure mounted on the machine in accordance with the invention can be easily applied to already existing machines as well, which are provided with an electronics of their own on board, so that the possibility of use of the invention is made very large.

The invention thus conceived is clearly susceptible of industrial application; it can be also submitted to many modifications and variations all falling within the scope of the inventive idea; in addition, all details can be replaced by technically equivalent elements.

The invention claimed is:

1. A machine or producing and dispensing liquid or semi-liquid food products, comprising:
    a holding vat for a liquid base product;
    a treatment circuit associated with the holding vat for receiving and treating the liquid base product to obtain a liquid or semiliquid food product;
    a dispensing mechanism associated with the treatment circuit to receive and dispense said food product;
    at least one actuator acting on at least one chosen from said base product, food product and parts of said machine;
    at least one sensor to detect at least one operating parameter of the machine,
    an interfacing unit operatively associated with the at least one sensor to receive the at least one operating parameter and transmit it to a remote processing unit;
    a local processing unit connected at least to the at least one sensor and the at least one actuator and configured to control operation of the machine;
    wherein the interfacing unit comprises a management module operatively associated with the local processing unit to receive the at least one operating parameter, compare it with a reference value and transmit a notification signal to the remote processing unit, depending on the comparison;
    wherein the management module is configured to carry out a series of transmitting operations, subsequent to the transmission of the notification signal, to transmit a series of detected measures of the at least one operating parameter during a predetermined time interval to the remote processing unit;
    wherein the series of detected measures comprises measures preceding transmitting of the notification signal and measures following transmitting of the notification signal;
    wherein the interfacing unit is further operatively associated with the at least one actuator to make the at least one actuator receive a local command/adjustment signal as a function of a remote command/adjustment signal sent to said interfacing unit by the remote processing unit;
    wherein the at least one operating parameter includes:
        movement speed of at least one moving part of the machine; and
        a state variable of at least one switch or actuator present in the machine.

2. The machine as claimed in claim 1, wherein the reference value is defined by a previous reading of the at least one operating parameter.

3. The machine as claimed in claim 1, wherein transmission of the at least one operating parameter to said remote processing unit is started at a predetermined time limit.

4. The machine as claimed in claim 1, wherein transmission of the at least one operating parameter to said remote processing unit is started following a situation of at least one chosen from failure, malfunction and alarm of the machine.

5. The machine as claimed in claim 1, wherein said interfacing unit further comprises a communication module transmitting at least one chosen from the at least one operating parameter and the notification signal to said remote processing unit.

6. The machine as claimed in claim 5, wherein said communication module is drivable between a rest condition at which it transmits no signals, and an operating condition at which at least it transmits signals.

7. The machine as claimed in claim 5, wherein said communication module is normally in said rest condition, and is driven to the operating condition by said management module to transmit the at least one operating parameter to said remote processing unit.

8. The machine as claimed in claim 5, wherein said interfacing unit is operatively associated with the at least one actuator to make the at least one actuator receive a local command/adjustment signal as a function of a remote command/adjustment signal sent to said interfacing unit by said remote processing unit and said management module is associated with said local processing unit to make the latter receive said remote command/adjustment signal and enable said local processing unit to transmit said local command/adjustment signal to said at least one actuator.

9. The machine as claimed in claim 1, wherein said interfacing unit further comprises a memory, said management module being associated with said memory to store said remote command/adjustment signal, said local processing unit being associated with said memory to read said remote signal and generate said local signal, as a function of said remote signal.

10. The machine as claimed in claim 9, wherein said memory is operatively associated with said management module for storage of the at least one operating parameter for at least one chosen from comparison and transmission to said remote processing unit.

11. The machine as claimed in claim 8, wherein said communication module is driven from the rest condition to the operating condition by a connection request signal transmitted by said remote processing unit, said communication module configured to receive said remote command/adjustment signal when it is in the operating condition.

12. The machine as claimed in claim 5, wherein said communication module is at least one chosen from a GSM/GPRS modem, an ADSL modem, an ISDN modem, an Ethernet module, and a module for connection to a local network, which is in turn connectable to a network enabling remote connection to said remote processing unit.

13. The machine as claimed in claim 1, wherein said remote command/adjustment signal is generated by said remote processing unit as a function of a main signal transmitted by a computer remotely connected to said remote processing unit.

14. The machine as claimed in claim 1, wherein the at least one operating parameter includes each of the following:
temperature of the base product;
temperature of the finished product;
temperature of specific regions within the machine.

15. The machine as claimed in claim 1, wherein the at least one operating parameter includes each of the following:
pressure inside portions of the machine.

16. The machine as claimed in claim 1, wherein the at least one operating parameter includes each of the following:
levels of product inside of the machine.

17. The machine as claimed in claim 1, wherein the at least one operating parameter includes each of the following:
amount of product dispensed through said dispensing mechanism.

18. The machine as claimed in claim , wherein the at least one operating parameter includes each of the following:
percentages in a composition of said product.

19. The machine as claimed in claim 1, wherein the at least one operating parameter includes each of the following:
physical features of the base product or the finished product.

20. The machine as claimed in claim 1, wherein the at least one operating parameter includes each of the following:
currents or voltages representative of at least one electric/electronic device present in the machine.

21. The machine as claimed in claim 1, wherein the remote command/adjustment signal is sent to the interfacing unit in real time in response to the notification signal.

22. A machine for producing and dispensing ice cream food products, comprising:
a holding vat for a liquid base product;
a treatment circuit associated with the holding vat for receiving and treating the liquid base product to obtain an ice cream food product, the treatment circuit including a refrigeration circuit for freezing the liquid base product and a whisking device for whisking the liquid base product into an ice cream food product;
a dispensing mechanism associated with the treatment circuit to receive and dispense said food product;
at least one actuator acting on at least one chosen from said base product, food product and parts of said machine;
at least one sensor to detect at least one operating parameter of the machine,
an interfacing unit operatively associated with the at least one sensor to receive the at least one operating parameter and transmit it to a remote processing unit;
a local processing unit connected at least to the at least one sensor and the at least one actuator and configured to control operation of the machine;
wherein the interfacing unit comprises a management module operatively associated with the local processing unit to receive the at least one operating parameter, compare it with a reference value and transmit a notification signal to the remote processing unit, depending on the comparison;
wherein the management module is configured to carry out a series of transmitting operations, subsequent to the transmission of the notification signal, to transmit a series of detected measures of the at least one operating parameter during a predetermined time interval to the remote processing unit;
wherein the series of detected measures comprises measures preceding transmitting of the notification signal and measures following transmitting of the notification signal;
wherein the interfacing unit is further operatively associated with the at least one actuator to make the at least one actuator receive a local command/adjustment signal as a function of a remote command/adjustment signal sent to said interfacing unit by the remote processing unit;
wherein the at least one operating parameter includes:
movement speed of at least one moving part of the machine; and
a state variable of at least one switch or actuator present in the machine.

* * * * *